United States Patent [19]
Gardner

[11] 3,897,100
[45] July 29, 1975

[54] TRUCK BODY COVER AND MOUNTING MEANS THEREFOR

[76] Inventor: Tom Gardner, 5907 Swiss Ave., Dallas, Tex. 75214

[22] Filed: Nov. 23, 1973

[21] Appl. No.: 418,278

[52] U.S. Cl............. 296/10; 296/23 R; 296/137 R; 296/100
[51] Int. Cl.................................................. B60j 7/02
[58] Field of Search ............ 296/10, 16, 23 MC, 99, 296/137 B, 137 E, 137 R, 137 F, 100, 23 R

[56] References Cited
UNITED STATES PATENTS

| | | | |
|---|---|---|---|
| 1,712,363 | 5/1929 | Sparshatt | 296/100 |
| 1,729,555 | 9/1929 | Sparshatt | 296/100 |
| 2,159,022 | 5/1939 | Hawkins | 296/137 B |
| 2,875,839 | 3/1959 | Spinks | 296/10 |
| 2,976,078 | 3/1961 | Maidl | 296/99 |
| 3,165,352 | 1/1965 | Hallock | 296/100 |
| 3,675,967 | 7/1972 | Ahrens | 296/137 B |
| 3,764,179 | 10/1973 | Burton | 296/137 R |
| 3,773,380 | 11/1973 | Stockdill | 296/16 |

Primary Examiner—Robert J. Spar
Assistant Examiner—G. Auton
Attorney, Agent, or Firm—Joseph H. Schley; Thomas L. Cantrell

[57] ABSTRACT

Disclosed is a cover for a truck cargo body, such as a pick-up truck cargo body, which is mounted to the sidewalls of the cargo body by a system of rails so that it can slide back and forth on the cargo body. A separate bulkhead is mounted at the front of the cargo body for engaging the cover when it is in its forward position in a weather-tight manner. Preferably, the rail system includes telescoping elements for supporting the cover when it is slid back off of the body. Locking means are provided to secure the cover and bulkhead together. Preferably, a hatch is positioned in the top of the cover so that one may operate the vehicle as a hunting blind.

6 Claims, 6 Drawing Figures

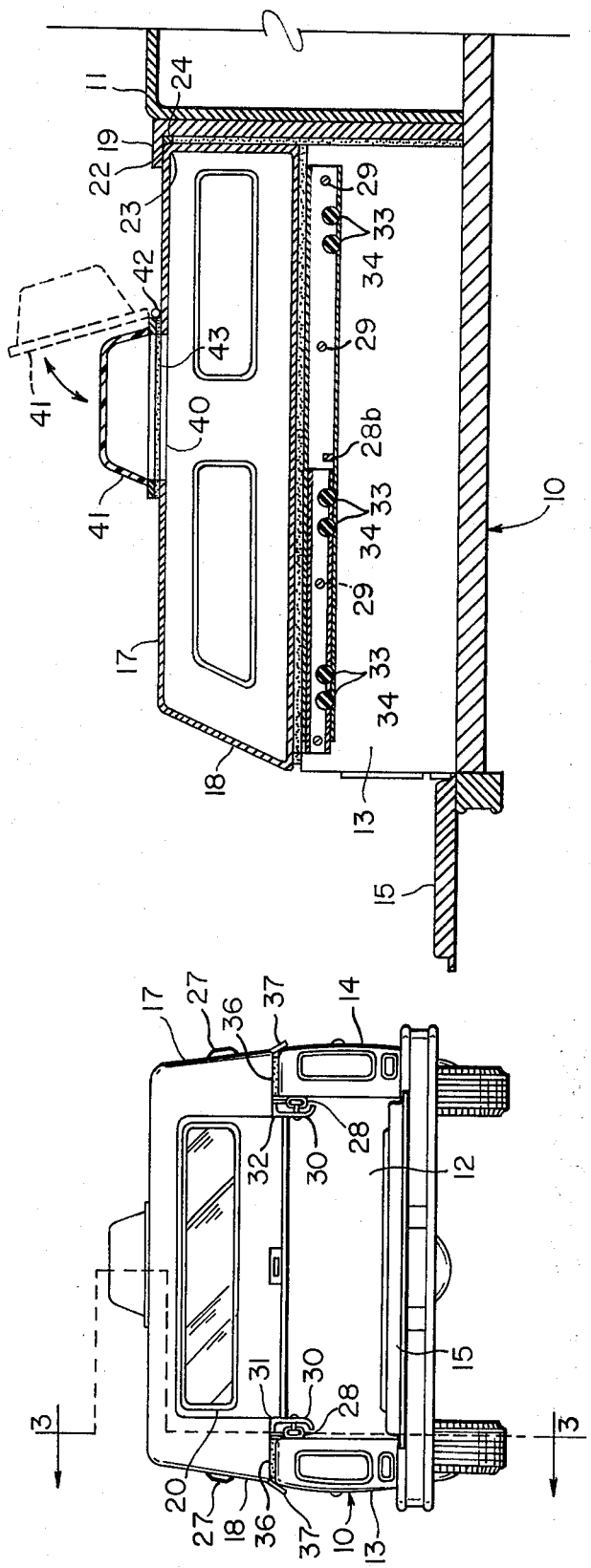
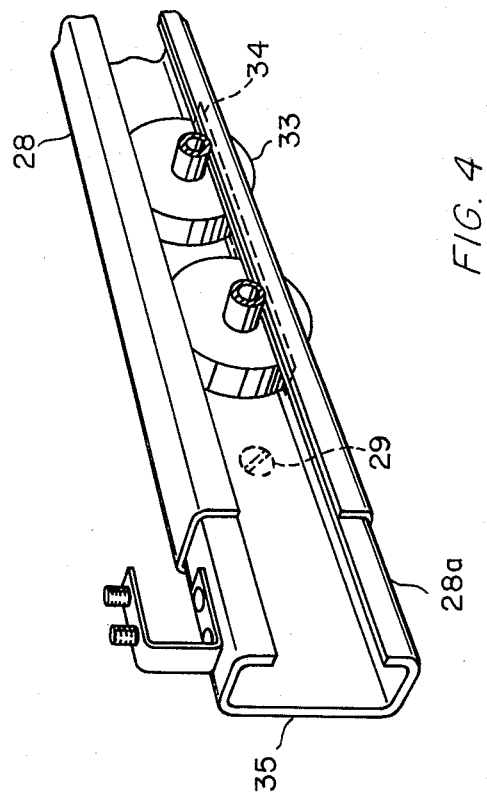
FIG. 3
FIG. 4
FIG. 2

TRUCK BODY COVER AND MOUNTING MEANS THEREFOR

BACKGROUND OF THE INVENTION

This invention relates to covers for pick-up trucks.

Pick-up truck bodies have normally open topped cargo spaces defined by the truck cab in front, the sidewalls of the body on the sides, and a swinging tailgate at the rear. The sidewalls usually have generally straight top edges or margins. The cargo space is thus in the shape of a rectangular open topped box.

Recently, it has become popular to mount covers of various types over the cargo spaces or cargo boxes of pick-up trucks for both recreational and business purposes, and to better adapt the vehicles to mixed recreational and business use. Two general types of covers are employed. The simpler of these is an open bottomed shell with a hinged back window, which is bolted or otherwise attached to the tops of the cargo space sidewalls and sealed against the truck cab at the front to provide a weather tight enclosure. The other type is a box-like structure, sometimes fairly elaborate and resembling a building in design, which is closed at the bottom and proportioned to fit partially within the cargo box and partially above it. With the second type, it is necessary to remove the structure from the truck in order to utilize the cargo box for hauling cargo, and various means have been devised to facilitate loading the structure onto and off of the truck. (See U.S. Pat. Nos. 3,658,376; 3,655,234; and 3,738,517; see also older U.S. Pat. Nos. 1,799,233 and 1,804,542.)

The simpler first type of cover does not completely prevent the use of the cargo box for hauling cargo or equipment, but it does make it very inconvenient, because the limited headroom characteristic of this type of cover makes it a clumsy chore to get to and handle cargo at the front end of the box. For this reason at least one system for simplifying the mounting and demounting of shell type covers has been proposed. (See U.S. Pat. No. 3,598,251.) But aside from complete removal, no means have been generally available heretofore for eliminating the awkwardness and inconvenience of loading and unloading cargo or equipment from the front portion of a cargo box with a shell type cover ("camper top") mounted on it.

One common use to which pick-up trucks equipped with camper shells are put is for cold weather hunting. But there are no generally available means adapting such vehicles for use as stationary hunting blinds providing shelter against the cold and a wide angle of fire at the same time.

SUMMARY OF THE INVENTION

In accordance with a major aspect of the present invention, there is provided an improved cover for pick-up truck cargo boxes which eliminates the inconvenience of poor accessibility to the front of the cargo space. A bulkhead is mounted at the front of the cargo box immediately behind the truck cab. The rearwardly facing side of the bulkhead has means for engaging and sealing with the front edge of the cover itself, which, unlike conventional covers, is open in the front. Rails are mounted along the top edges of the sidewalls of the cargo space, and antifriction means adapted to run in the rails are mounted along the bottom edges of the cover. In this manner, the cover is made slidable on the cargo box. The means providing engagement between the bulkhead and the cover itself may include key-operated latches, if desired. For heavier types of covers, or for deluxe installations, provision may be made to slide the cover back and forth on the cargo box by power operated means, such as an electric motor operated from the vehicle electrical system driving cables attached to the cover at suitable points. Such a power operated system may be controlled from within the vehicle cab, if desired. Preferably, the rails include telescoping elements so that the cover may be slid back far enough to expose about the front two-thirds of the cargo box.

When it is desired to load or unload objects from the front portion of the cargo space of a pick-up truck equipped with the cover unit of the invention, the user unlatches the cover portion from the bulkhead and slides it backwardly (by hand or through power operated means) to expose the front of the cargo box. The objects are then lifted into or out of the box over the sidewall. When the operation is completed, the cover portion is again slid forward into sealing and latching engagement with the bulkhead.

In accordance with another aspect of the invention, the cover is provided with a hatch opening in its upper surface sized to accommodate the shoulders and torso of a person therethrough. A transparent hatch cover, preferably of plastic such as polymethylmethaerylate is mounted over the opening, and hinged at one side. The hatch cover is generally bubble shaped so that a hunter can sit within the cargo space and observe through the hatch until a game animal approaches in range, and then throw the hatch cover back, stand up and fire. In accordance with another embodiment of the invention, the hatch is made slidable so that the hunter may readily slide it back upon the approach of an animal.

From the foregoing, it can be seen that a principal object of the invention is to provide an improved cover for pick-up trucks and means for mounting such a cover so that it gives easy access to the forward part of the cargo box.

A further object of the invention is the provision of a pick-up truck body cover especially suitable for use as a hunting blind.

The manner in which the foregoing objects, together with other objects and purposes, are achieved can best be understood by a consideration of the detailed description which follows, together with the accompanying drawings.

DESCRIPTION OF THE DRAWINGS

FIG. 2 is a rear elevational view of the truck and cover of FIG. 1;

FIG. 3 is a fragmentary sectional side elevational view of the cover of the invention, the section being taken on the line 3—3 of FIG. 2;

FIG. 4 is a fragmentary perspective view of mounting rails employed in accordance with the invention;

DESCRIPTION OF THE PREFERRED EMBODIMENTS

Figure 1:
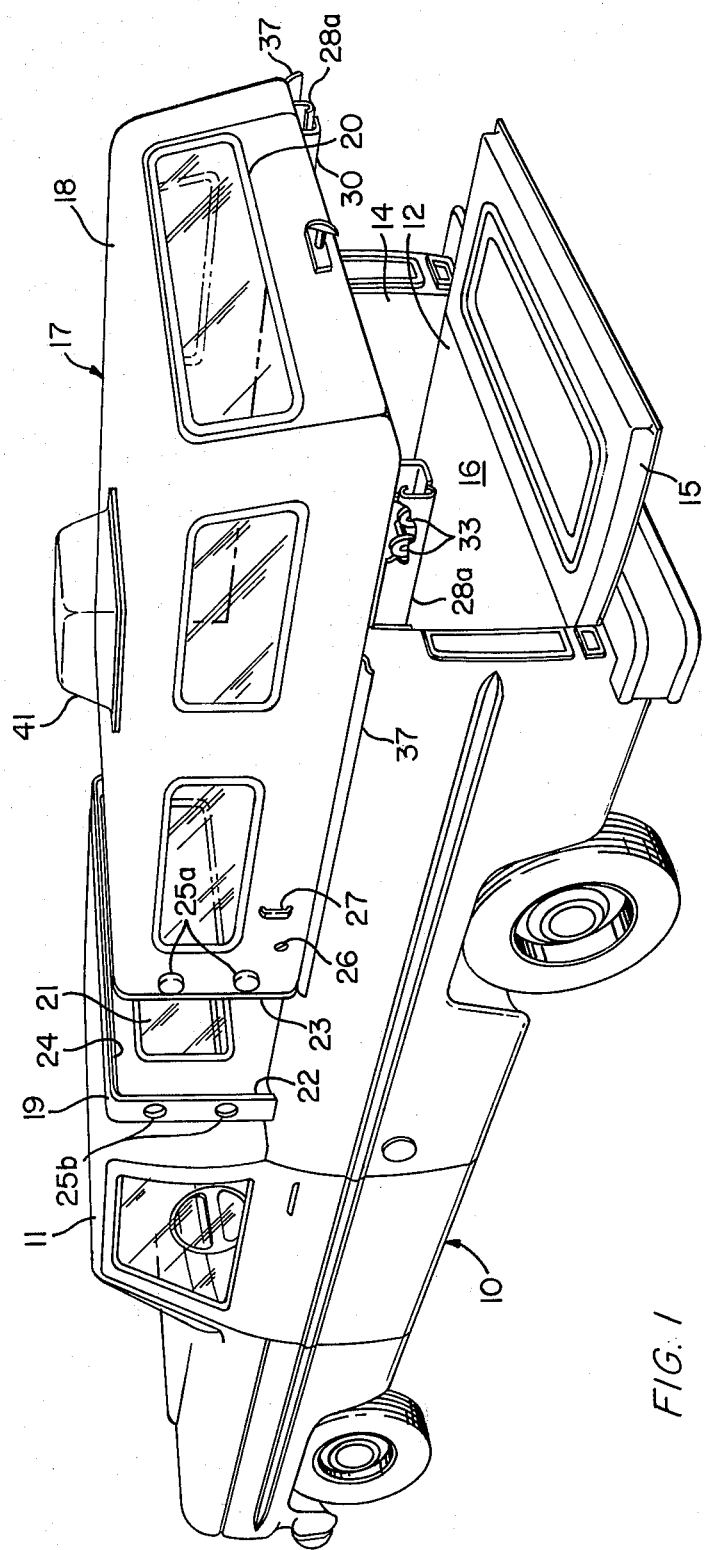
FIG. 1 is a rear perspective view of a pick-up truck with the cover of the invention installed thereon.

In the drawings, a pick-up truck is designated generally as 10. It includes a cab 11 and a cargo space or cargo box 12. The cargo space is defined or bounded by cab 11 at the front, by sidewalls 13 and 14 on the sides, and by downwardly folding tailgate 15 at the rear. It has a generally flat floor 16.

The cover of the invention is designated generally as 17. It includes a cover unit 18, and a bulkhead 19. The cover unit 18 is of the downwardly open shell type. It is preferably equipped with a hinged rear window 20 which cooperates with tailgate 15 to close the rear of the cargo space 12. Unlike conventional shell type covers, it is open at the front end. Cover 18 is slidingly mounted on sidewalls 13 and 14 by means discussed hereinbelow. In FIG. 1 it is pictured as slid back partially to provide access to the front of the cargo box; in FIG. 3 it is shown in its forward and locked position against bulkhead 19.

Bulkhead 19 is a generally rectangularly sheet of plastic, metal or other suitable material shaped to fit across the front end of the cargo space 12 in an upright position immediately behind cab 11. It may be fixed to the truck by suitable fastening means (not shown). It is preferably equipped with a rear view window 21 which is generally aligned with the rear view window of cab 11. The rear view window of the bulkhead may be fixed or sliding to conform with the type of rear window with which the cab is equipped. A rearwardly extending rim 22 runs around the upper periphery of bulkhead 19 in position to sealingly engage the front edge 23 of cover unit 18. Weatherstripping 24 is preferably placed at the jointure of the rim 22 with the bulkhead 19 to insure a weathertight seal with edge 23.

The engagement means of the invention include, in addition to rim 22, edge 23, and weatherstripping 24, latch means 25a and 25b. Latch means 25a are cylinders mounted on cover unit 18 for reciprocation into and out of holes 25b in rim 19. The latch means may be key-operated, and a keyhole 26 is indicated on FIG. 1 for that purpose. Other types of suitable latches may also be employed.

To facilitate moving cover unit 18 back and forth on the sidewalls 13 and 14, handles 27 may be provided. Such handles are particularly desirable on hand operated embodiments of the invention.

The slidable mounting of cover unit 19 on sidewalls 13 and 14 can best be seen by a consideration of FIG. 3 together with some reference to the remaining figures. In FIGS. 2 and 3, the proportions of some of the smaller parts have been exaggerated somewhat for clarity of illustration.

Channel shaped rails 28 are attached by metal screws 29 to the inside top margins of sidewalls 13 and 14. Generally, L-shaped rails 30 are attached to the bottom side edges 31 and 32 of cover unit 18. The horizontal legs of the L-shaped rails 30 extend under sidewall rails 28 and act to hold the cover 18 down on the cargo box. If desired, rails 30 may be made integral with edges 31 and 32. Rollers 33, preferably arranged in pairs, are mounted on rails 30 to run in rails 28. Detent slots 34 are provided in the bottoms of rails 28 at the positions where rollers 33 are located when the cover unit 18 is in its forward-and-locked position against bulkhead 19, to assure positive positioning of the cover. In order to further support the rear portion of cover unit 19 when it is displaced to the rear, channels 28 are preferably provided with telescoping sections 28a, the ends of which are attached by bracket 35 to the bottom edges 31 and 32 of cover 18. Rails 28 are equipped with a stop 28b which engages the forwardmost wheels 33 to limit backward travel of cover 18.

Foamed weatherstripping 36 is preferably provided on the bottom edges 31 and 32 of cover 18. When rollers 33 fall into detent slots 34, stripping 36 is compressed between the cover 18 and the tops of sidewalls 13 and 14 and provides a tight weather seal. When rollers 33 rise slightly upon leaving the detent slots, the frictional engagement between stripping 36 and sidewalls 13 and 14 is reduced so that it does not interfere with the sliding action. Additional weatherstripping 37 of vinyl plastic or rubber is also preferably provided externally of stripping 36.

A hatch opening 40 is provided in the roof of cover 18, proportioned to pass the shoulders and torso of a fully clothed adult easily. A hatch cover 41 of clear plastic is fitted over hatch opening 40. It is attached to the roof of cover 18 by hinge 42 on one side and a suitable latch (not shown) on the other, and sealed with weatherstripping 43. Hatch cover 41 is preferably hinge mounted on the side facing the front of the truck to eliminate the danger it might blow open when the vehicle is in motion. Hatch cover 41 is proportioned to easily accommodate the head of an adult and afford him full circle observation.

Figure 6:
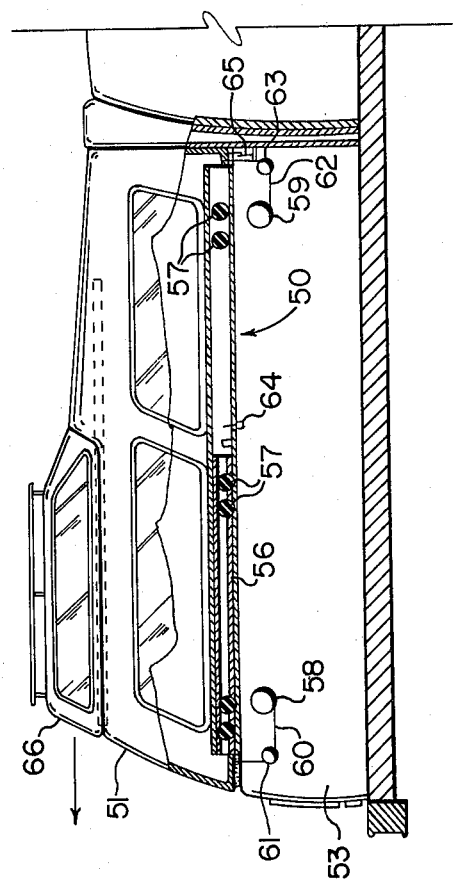
FIG. 6 is a fragmentary side elevational view, partly in section, of the embodiment of FIG. 5, the section being taken on the line 6—6 of FIG. 5.
Figure 5:
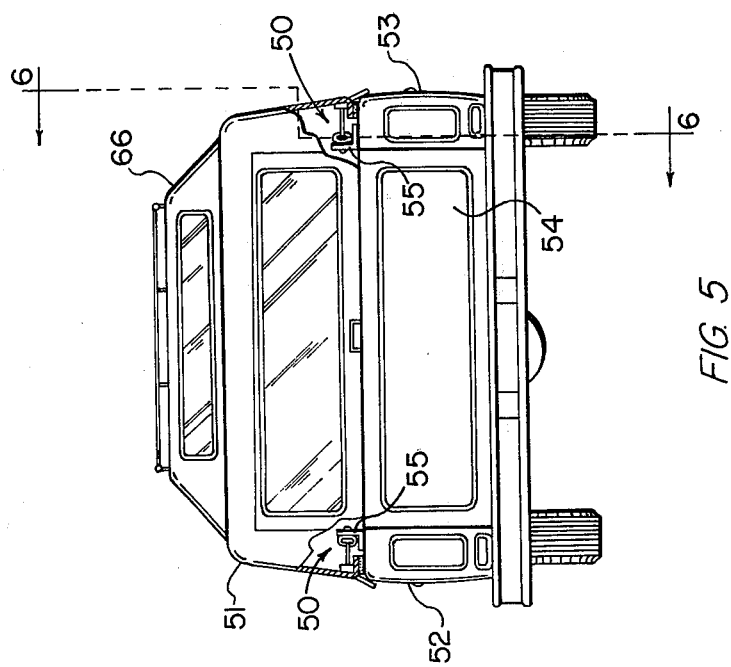
FIG. 5 is a rear elevational view, partly in section, of a truck with another embodiment of the invention installed thereon.

Attention is now directed to FIGS. 5 and 6 which illustrate another embodiment of the invention. While it is similar to the embodiment discussed in connection with FIGS. 1–4, it differs in several respects which are outlined hereinbelow.

In the embodiment of FIGS. 5 and 6, the rail system 50 by which slidable mounting of the cover 57 is effected is mounted on the tops of the cargo box sides 52, 53 instead of at the inside of the top margins, as was the case in the embodiment of FIGS. 1–4. In this manner, the necessity for having the tailgate 54 in its open position in order to slide the cover is eliminated. The rail system 50 includes an L-shaped support 55, which carries telescoping rails 56, in which run rollers 57, mounted at intervals on the cover 51. Except for the reversal of the direction in which the open sides of rails 56 face (outboard instead of inboard, compare FIG. 6 and FIG. 2), the operation and basic structure of the rail system is substantially as discussed above in connection with FIGS. 1–4.

A simple power operation system is illustrated very diagrammatically on FIG. 6, from which workers of ordinary skill can see the principles of such power operation and devise other suitable systems, if desired. Two small DC motors 58 and 59 are mounted on side 53. Each is provided with a capstan, and their direction of powered rotation is indicated by arrows. A cable 60 is wrapped around the capstan of motor 58, trained around pulley 61, and attached to the back of cover 51. Similarly, cable 62 is wrapped around the capstan of motor 59, trained around pulley 63, and attached to the front of cover 51. Limit switch 64, tripped by forward rollers 57, cuts off motor 58; limit switch 65, tripped by the front of cover 51, cuts off motor 59. The motors are started by switches conveniently located in the truck cab, or on the truck sides.

Finally, the embodiment of FIGS. 5 and 6 differs from the first embodiment in that it has a sliding hatch 66, mounted on rails 67, for use as a hunting observation and firing point.

What is claimed is:

1. Apparatus for retractably covering in a substantially weathertight sealing configuration an open topped cargo space portion of a pick-up truck body of the kind having the truck cab forward of the cargo space, said cargo space being formed by upstanding side and front walls having generally straight top edges and enclosable by a tailgate section along a backwall, and said apparatus providing selective access to the frontal portion of said cargo space and comprising:

a generally rigid elongate cover of length and width substantially equivalent to that of said cargo space and having first and second longitudinal side sections forming an open ended U-shape frontal portion contiguous to and extending generally upwardly with respect to a longitudinally extending open bottom portion and adapted for substantially covering the cargo space of the truck;

a bulkhead mounted to and upwardly extending from the front wall of said cargo space and having an upwardly extending height and width substantially equivalent to the height and width of the open ended frontal portion of said cover and the upwardly extending cab of the truck adjacent thereto, said bulkhead being adapted for abuttingly receiving on the face thereof the frontal edge of said open ended U-shaped frontal portion of said cover;

means associated with said bulkhead for sealingly engaging the open ended frontal edge of said cover in abutting engagement therewith, and forming a frontal wall thereto, whereby said cargo space may be substantially enclosed by positioning said cover atop said cargo space and adjacent said bulkhead;

first and second rail members, each mounted at the top edge of one of the side walls in parallel spaced relationship with the other and having rearwardly extensible telescoping portions adapted for bilateral movement rearwardly from and forwardly to said bulkhead for supporting the rearward portion of said cover when positioned thereon in a generally horizontal plane rearwardly extending from the truck;

antifriction means mounted along the bottom edges of said first and second side sections of said cover in position to run in said rails and said rearwardly extensible telescoping portions thereof for providing a bilateral movement of said cover over the open topped portion of the truck rearwardly from and forwardly to said bulkhead for providing access to the frontal portion of said cargo space;

lock means for releasably securing said cover in sealable engagement with said bulkhead whereby said cover will selectively maintain its engagement with said bulkhead in a substantially weathertight sealing configuration;

means for sliding said cover along said rails rearwardly from and forwardly to said bulkhead to provide access to the frontal portion of said cargo space adjacent to the cab of the truck; stop means on said rails limiting rearward travel of said antifriction means and said cover mounted thereto, whereby the distance of movement of said cover over said cargo space is defined by said bulkhead for movement forwardly thereto, and by said stop means for movement rearwardly from said bulkhead.

2. Apparatus in accordance with claim 1 in which said antifriction means are rollers and further comprising a pair of mounting rails for said rollers, one attached to each bottom edge of said first and second side sections of said cover.

3. Apparatus in accordance with claim 1 in which said rails are mounted on top of said sidewalls.

4. Apparatus in accordance with claim 1 in which said rails are mounted on the inside top margins of said sidewalls.

5. Apparatus in accordance with claim 1 in which said means for sliding said cover along said rails include a power driven means for sliding said cover rearwardly from and forwardly to said bulkhead.

6. Apparatus in accordance with claim 1 and further comprising a substantially transparent sided hatch in the roof of said cover proportioned to accommodate the shoulders and torso of a person.

* * * * *